May 27, 1930.  C. C. BLACKMORE  1,760,340
OIL FILTER
Filed July 21, 1927    3 Sheets-Sheet 3
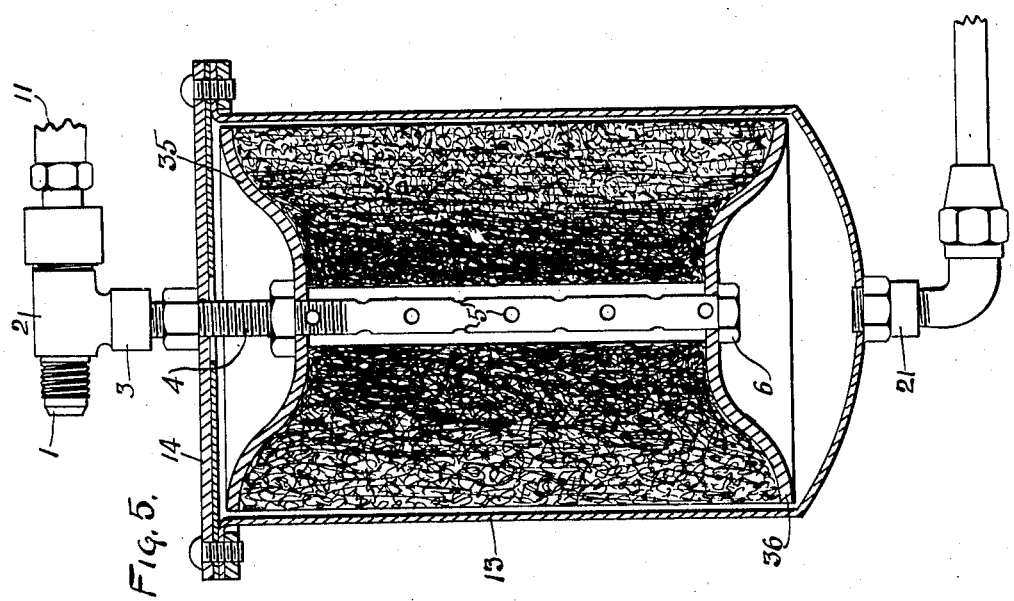
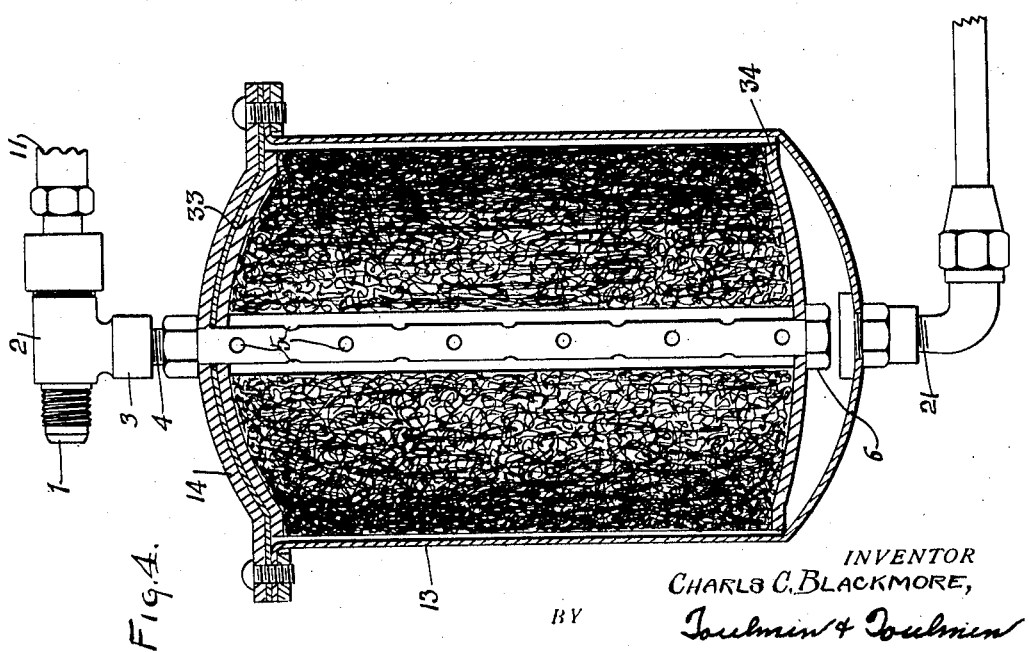
INVENTOR
CHARLS C. BLACKMORE,
BY
ATTORNEYS Patented May 27, 1930

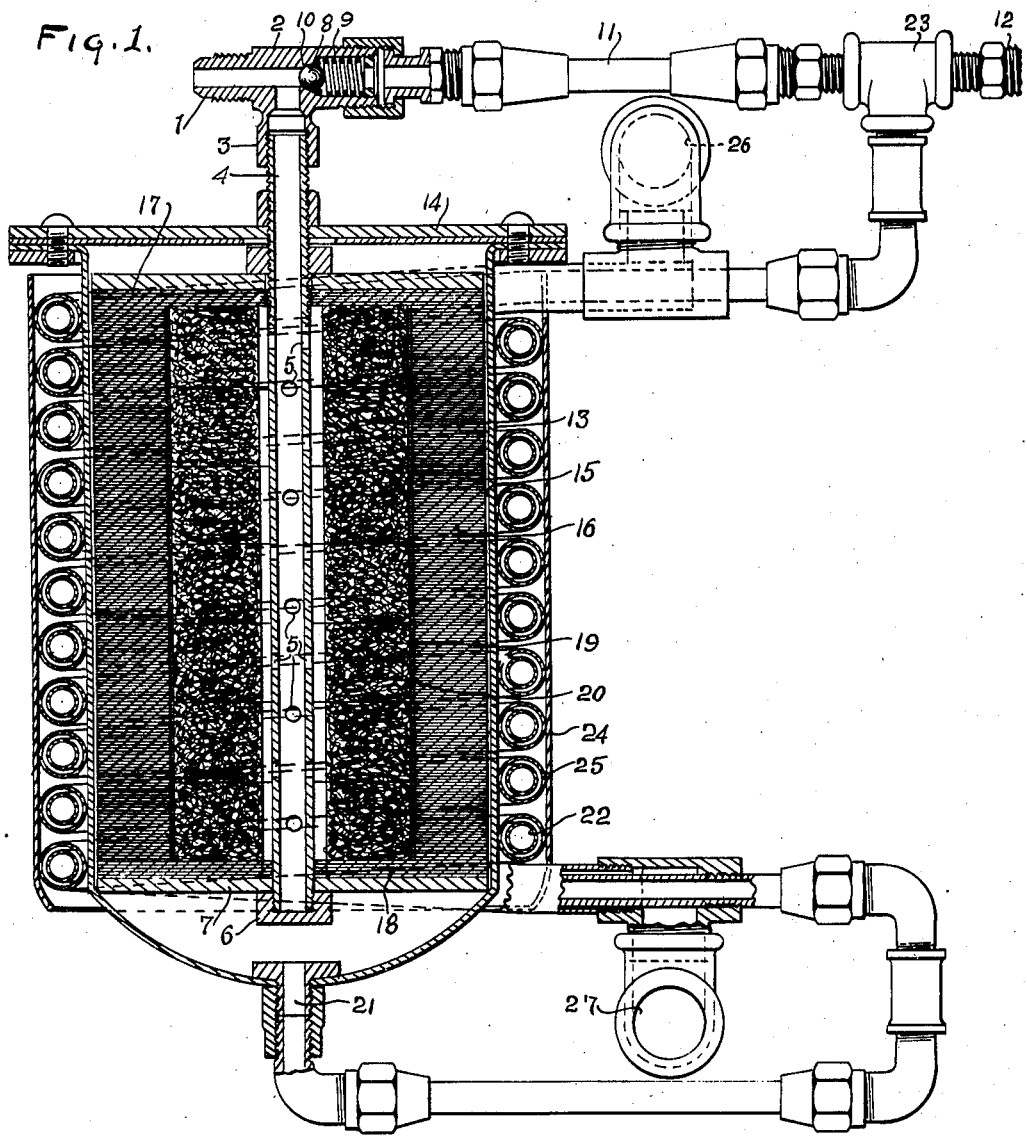

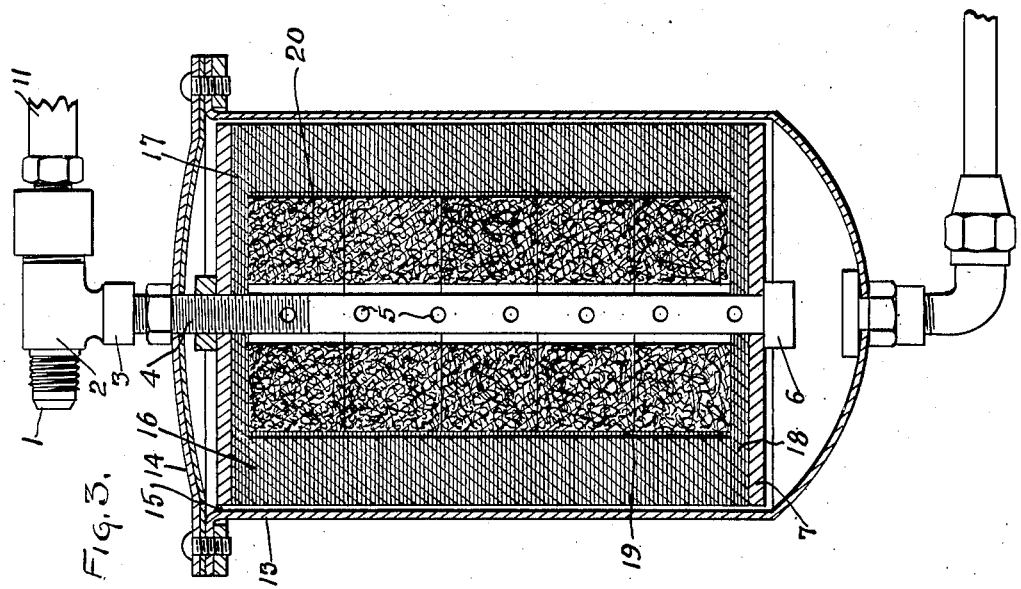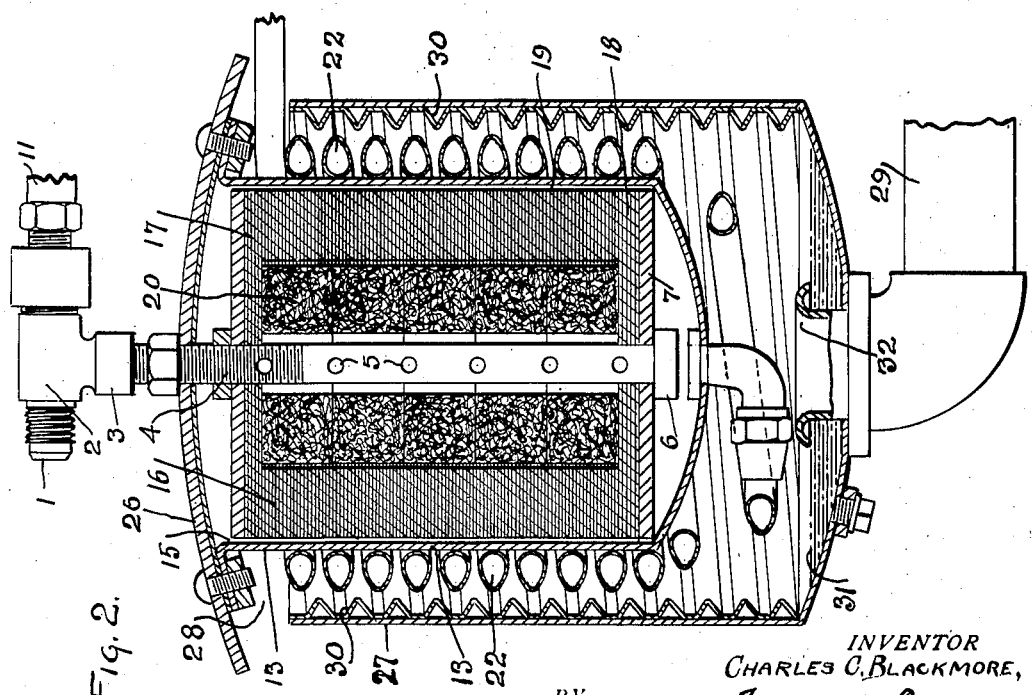

1,760,340

UNITED STATES PATENT OFFICE

CHARLES C. BLACKMORE, OF DAYTON, OHIO

OIL FILTER

Application filed July 21, 1927. Serial No. 207,387.

My invention relates to oil filters and oil coolers.

It is the object of my invention to provide an oil filter and an oil cooler and a combined oil filter, oil cooler and dust collector.

Due to the necessity of cooling oil for internal combustion engines particularly in motor boats and airplanes and, due to the restricted space available for such equipment, either in an automobile, motor boat or airplane, it is desirable to reduce the number of pieces of equipment for performing the oil filtering, oil cooling and air cleaning.

It is my object to provide an oil filter provided with successive stages of filtering.

It is my object to provide such filtering in order to eliminate the formation of any barriers to the flow of oil through the filter by the accumulation of the heavier particles; by the use of separate filtering mediums separately arranged and having separate actions, I am enabled to secure the successive elimination of foreign matter of different sizes and kinds and arrange for the removal of the filtering elements independently of one another.

It is a further object to filter out the foreign matter by stages according to size, removing the heavier particles first as the coarser bodies permit the finer bodies to pass through them so that the successive filterings of the oil will not be impeded by the heavier accumulation of the heavier particles of foreign matter.

It is my further object to provide filtering mediums for such successive stages having different degrees of compression and condensate to effect these several objects.

It is my object to provide a compact unitary structure in which the oil filter may also have associated with it oil cooling devices and air cleaning mechanisms.

Referring to the accompanying drawings:

Figure 1 is a section through the combined stage oil filter and oil cooler;

Figure 2 is a section through the combined oil filter, oil cooler and dust collector in one complete unitary structure;

Figure 3 is a section through the oil filter;

Figure 4 is a modified construction in section of a variable condensate oil filter with the cooling pipes removed for the purpose of simplicity and illustration;

Figure 5 is a similar view of another type of oil filter.

Referring to the drawings in detail, 1 indicates an inlet pipe from the pump connected to a T 2, which has a downwardly extending pipe 3 connected to the filter delivery pipe 4, which extends into the filtering chamber and is provided with a plurality of radially disposed apertures 5.

The end of this pipe is sealed by a plug 6 carrying a supporting washer 7 for supporting the filtering mediums.

The T 2 is provided with a by-pass check valve consisting of a ball 8 and spring 9 seating it against the seat 10. In the event that there is a stoppage in the oil filter, the oil can pass through the by-pass pipe 11 directly to the exit pipe 12 and thence to the engine.

The filtering casing consists of a cup-shaped member 13 having a cap 14. Suspended within this cup 13 and spaced from the walls thereof so as to leave a space 15 are a plurality of superimposed disks of filter paper designated 16 through which the oil filters edgewise. Layers of filter paper 17 at the top and layers of filter paper 18 at the bottom extend completely across the filtering chamber 13 to within a short distance of the walls thereof. The disks of filter paper 16 in between are so arranged as to provide a space 19 therein for the reception of fibrous filtering disks 20, a plurality of which are mounted in spaced relationship upon the oil tube 4.

The oil entering the pipe 4 making its exit through the apertures 5 therein first is filtered by the fibrous felt members 20 and then passes through them into the filter paper, whence it passes edgewise and then makes its exit into a space 15 where it comes in contact with the cooled walls of the casing 13, thus securing a pre-cooling effect.

It then runs down to the bottom of the casing and makes its exit through the pipe 21.

This pipe 21 is formed into a coil 22 about the outside of the casing 13 leaving the casing at the top thereof where it joins the pipe 12 through the T 23. A casing 24 is mounted on the outside of this coil.

The coil itself is provided with an outside water conveying pipe coil 25, the inlet for which is at 26 and the outlet for which is at 27. This water circulating coil is in engagement with the casing 13 in order to cool that casing and effect a pre-cooling of the oil which has been filtered.

The water supply may be from outside of the motor boat or may be supplied by a special pump from a reservoir or it may be pumped from the water in which the boat rests, depending upon the water circulation system provided for that type of engine.

It may be supplied from a water cooling radiator as in the casing of a plane.

The filtering members may be adjusted in their compression by the nuts 6 and washers 7, so that the degree of filtering may be adjusted. In addition to that, the entire filtering body may be removed or one stage of the filtering medium may be removed for replacement or cleaning or both.

When it is desired to combine with this apparatus an air cleaner, I provide a supplementary cap member 26 and a supplementary spaced casing member 27. A space 28 is provided between the cap 26 and the casing 27 for the entrance of air which is drawn in by the carburetor casting which is connected by a pipe 29 to the bottom of the casing 27.

The air is induced to flow over the oil pipes 22 coiled around the casing 13. The air has imparted to it a spiral motion by the fins 30 in the interior of the casing 27. Thus, in one compact condensed casing, I am enabled to provide an oil filter, an oil cooler and an air filter or dust collector. The oil pipes are cooled by the incoming air. The dust laden air feature having had a centrifugal motion imparted to it is reversed in direction at the bottom of the casing 27 causing it to drop its dust in the bottom of the casing as at 31, as the air must pass up and reverse its direction in order to get into the pipe 29 whose inlet end is expanded as at 32 to enter the casing 27 an appreciable distance above the bottom thereof.

The incoming air cools the oil. The incoming oil is filtered in an air cooled chamber where it gets some degree of pre-cooling. The oil filtering chamber acts as the inner guiding wall for the air in the dust collector. Thus, the limited space available is occupied by only one structure, which, through the cooperation of its several parts, performs the treble function of oil filtering, oil cooling and dust collecting. This is an advantage not only in ground machines, such as in tractors, tanks and the like, but also in airplanes, particularly those that have to do with dusting operations where large quantities of dust are loaded into the machine and discharged from the machine as in the dusting of calcium arsenate.

Referring to Figure 4, it will be noted that I have provided a special form of upper and lower compression washer designated 33 and 34. This washer is so arranged that the outer filtering medium, such as the filter paper, may be more greatly compressed in varying degrees outwardly.

In Figure 5 the reverse action is provided for as the primary compression is on the interior rather than the exterior by reason of the configuration of the washers 35 and 36.

I desire to comprehend within my invention such modifications as may be fairly embraced within my claims and the scope of my invention.

Having thus fully described my invention, what I claim as new and desire to secure by Letters Patent, is:

1. In combination, an oil filter casing, means in said casing for delivering filtered oil to the exterior thereof along the inside of the outside wall of the casing, a water pipe coil mounted around said casing for imparting a primary cooling to the filtered oil, and an oil coil mounted within said water coil adapted to convey the filtered oil through said water coil for a secondary cooling.

2. In combination, an oil filter casing, means in said casing for delivering filtered oil to the exterior thereof along the inside of the outside wall of the casing, a water pipe coil mounted around said casing for imparting a primary cooling to the filtered oil, and an oil coil mounted within said water coil adapted to convey the filtered oil through said water coil for a secondary cooling, and an exterior casing surrounding said combined oil and water coil.

3. In combination, an oil filter casing, means in said casing for delivering filtered oil to the exterior thereof along the inside of the outside wall of the casing, a water pipe coil mounted around said casing for imparting a primary cooling to the filtered oil, and an oil coil mounted within said water coil adapted to convey the filtered oil through said water coil for a secondary cooling, and a by-pass pipe between the oil inlet to the filter and an oil exit to the engine, and means in said by-pass for permitting the bypassing of oil when a predetermined pressure of oil is exceeded.

4. In a filter, the combination of a casing, an inlet distribution pipe projecting within said casing, a washer on the inner end of said pipe, a cylindrical filter means supported by said washer and surrounding said pipe, said filter means being composed of filter paper with both ends closed by layers of filter paper.

5. In a filter, the combination of a casing, an inlet distribution pipe projecting within said casing, a washer supported on the inner end of said pipe, a cylindrical filter means supported by said washer composed of filter paper with both ends closed by layers of filter paper, and a series of fibrous disks surrounding said distribution pipe within said cylinder to form an inner part of the filter.

6. In a filter, the combination of a casing, an inlet distribution pipe projecting within said casing, a cylinder shaped filtering means composed of filter paper surrounding said distribution pipe, a second filter means within said cylinder and surrounding said distribution pipe, and an exit pipe leading from said casing and coiled around said casing.

In testimony whereof, I affix my signature.

CHARLES C. BLACKMORE.